United States Patent
Rivero

(10) Patent No.: US 8,550,707 B2
(45) Date of Patent: Oct. 8, 2013

(54) DEVICE FOR DETECTING TEMPERATURE VARIATIONS IN A CHIP

(75) Inventor: Christian Rivero, Luynes (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 315 days.

(21) Appl. No.: 12/894,822

(22) Filed: Sep. 30, 2010

(65) Prior Publication Data

US 2011/0080933 A1    Apr. 7, 2011

(30) Foreign Application Priority Data

Oct. 2, 2009    (FR) ...................... 09 56876

(51) Int. Cl.
*G01K 7/00*    (2006.01)
*G01K 3/00*    (2006.01)

(52) U.S. Cl.
USPC ............ 374/183; 374/185; 374/166; 374/110

(58) Field of Classification Search
USPC .................. 374/130, 126, 121, 208
See application file for complete search history.

(56) References Cited

U.S. PATENT DOCUMENTS

| | | | |
|---|---|---|---|
| 2,990,529 A | 6/1961 | Courtney-Pratt | |
| 3,403,558 A | 10/1968 | Elliott | |
| 4,426,874 A * | 1/1984 | Moore | 73/1.15 |
| 5,444,219 A | 8/1995 | Kelly | |
| 6,114,943 A * | 9/2000 | Lauf | 338/34 |
| 2005/0265898 A1* | 12/2005 | Bell et al. | 422/82.01 |
| 2007/0263700 A1* | 11/2007 | Moelkner et al. | 374/188 |
| 2010/0045362 A1* | 2/2010 | Dribinsky et al. | 327/513 |
| 2010/0315108 A1* | 12/2010 | Fornara et al. | 324/706 |

FOREIGN PATENT DOCUMENTS

JP    58033136 A    2/1983

OTHER PUBLICATIONS

French Search Report dated Jun. 10, 2010 from corresponding French Application No. 09/56876.

* cited by examiner

*Primary Examiner* — Mirellys Jagan
(74) *Attorney, Agent, or Firm* — Wolf, Greenfield & Sacks, P.C.

(57) ABSTRACT

A device for detecting temperature variations of the substrate of an integrated circuit chip, including, in the substrate, implanted resistors connected as a Wheatstone bridge, wherein each of two first opposite resistors of the bridge is covered with an array of metal lines parallel to a first direction, the first direction being such that a variation in the substrate stress along this direction causes a variation of the unbalance value of the bridge.

27 Claims, 3 Drawing Sheets

DEVICE FOR DETECTING TEMPERATURE VARIATIONS IN A CHIP

CROSS REFERENCE TO RELATED APPLICATIONS

This application claims the priority benefit of French patent application number 09/56,876, filed on Oct. 2, 2009, entitled "Device For Detecting Temperature Variations in a Chip," which is hereby incorporated by reference to the maximum extent allowable by law.

BACKGROUND OF THE INVENTION

1. Field of the Invention

The present invention relates to a device for measuring the substrate temperature of an integrated circuit chip.

2. Discussion of the Related Art

In many electronic systems, it is desired to be able to measure, in operation, the internal temperature of an integrated circuit chip. It is especially desired to detect possible abnormal rises in the chip temperature.

Temperature measurement devices have been based on the observation of the variations of the value of a resistor formed in the substrate of a chip. Indeed, since silicon has piezoresistive properties, the value of a resistor formed in a silicon substrate depends on the mechanical stress undergone by the substrate. Since temperature variations cause stress variations in the substrate, the resistance value is linked to the substrate temperature.

A disadvantage of this type of temperature measurement devices is their inaccuracy, especially due to the inaccuracies of resistor manufacturing methods. Indeed, at equal temperature, value differences can be observed between resistors formed in different chips of a same semiconductor wafer, and even more between resistors formed in separate chips of different semiconductor wafers.

SUMMARY OF THE INVENTION

Thus, an object of an embodiment of the present invention is to provide a device for measuring the temperature of the substrate of an integrated circuit chip, which overcomes at least some of the disadvantages of prior art solutions.

An object of an embodiment of the present invention is to provide such a structure enabling to perform an accurate temperature measurement.

An object of an embodiment of the present invention is to provide such a structure that can be formed by only using manufacturing steps necessary to the manufacturing of CMOS integrated circuits.

Thus, an embodiment of the present invention provides a device for detecting temperature variations of the substrate of an integrated circuit chip, comprising, in the substrate, implanted resistors connected as a Wheatstone bridge, wherein each of two first opposite resistors of the bridge is covered with an array of metal lines parallel to a first direction, the first direction being such that a variation in the substrate stress along this direction causes a variation of the unbalance value of the bridge.

According to an embodiment of the present invention, each of the two second opposite resistors of the bridge is covered with an array of metal lines parallel to a second direction orthogonal to the first direction.

According to an embodiment of the present invention, the first two opposite resistors have the shape, in top view, of parallel rectangular bars, the metal lines extending along the length of the bars.

According to an embodiment of the present invention, the implanted resistors have, in top view, a square shape.

According to an embodiment of the present invention, the implanted resistors comprise a doped region of a first conductivity type formed in a region of the second conductivity type.

According to an embodiment of the present invention, the metal lines are made of copper.

According to an embodiment of the present invention, the metal lines are made of aluminum.

The foregoing objects, features, and advantages of the present invention will be discussed in detail in the following non-limiting description of specific embodiments in connection with the accompanying drawings.

DETAILED DESCRIPTION

Figure 1:
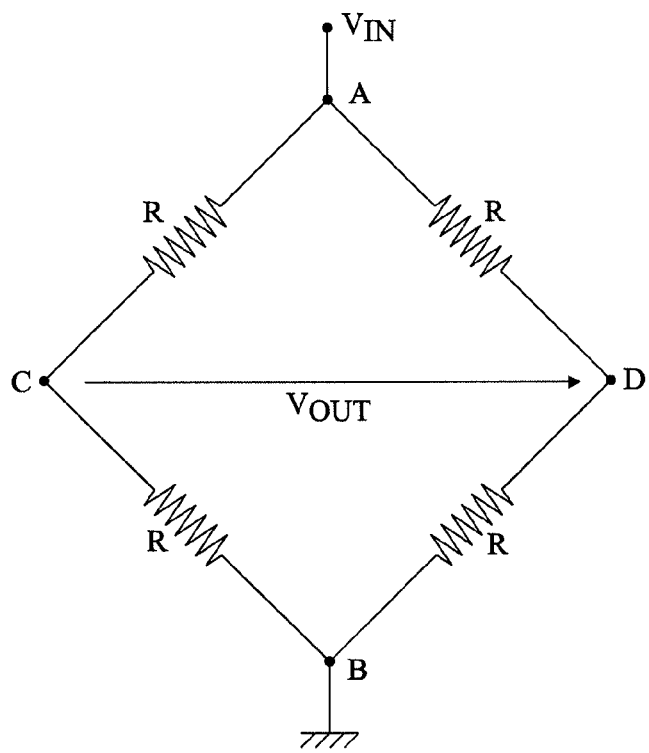
FIG. 1 shows the electric diagram of a Wheatstone bridge.

For clarity, the same elements have been designated with the same reference numerals in the different drawings and, further, as usual in the representation of integrated circuits, the various drawings are not to scale.

FIG. 1 shows the electric diagram of a Wheatstone bridge formed of four resistors R, for example, of same values. A voltage $V_{IN}$ is applied to a first diagonal of the bridge, between nodes A and B. An unbalance voltage $V_{OUT}$ may appear on a second diagonal of the bridge, between nodes C and D.

Since the resistors have the same values, the Wheatstone bridge is normally balanced and output voltage $V_{OUT}$ is close to 0 V whatever the value of $V_{IN}$. Further, output voltage $V_{OUT}$ is independent from possible temperature variations. Indeed, although the resistance values are capable of varying along with temperature, the drift undergone is substantially the same for all the bridge resistors. Thus, the balancing remains unchanged.

Figure 2A:
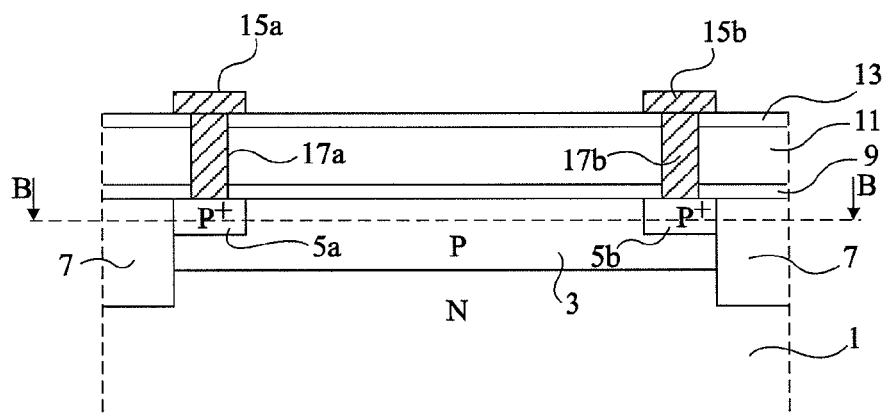
FIGS. 2A and 2B are cross-section and top views schematically showing an embodiment of a resistor.

FIG. 2A is a cross-section view schematically showing an implanted resistor formed in a semiconductor substrate, for example, made of silicon.

Figure 2B:
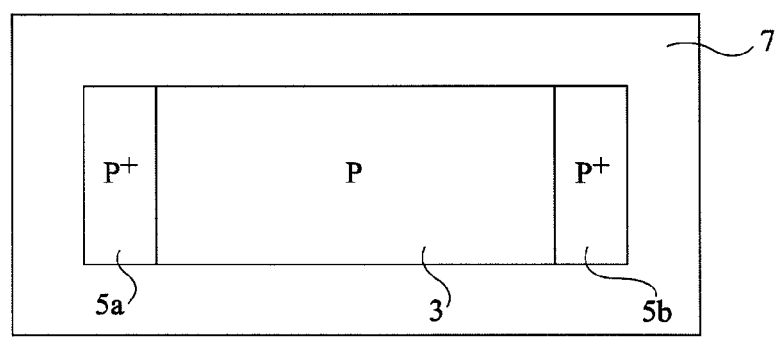

FIG. 2B is a top view of a cross-section along plane B-B of FIG. 2A.

A P-type doped region 3 is formed in the upper portion of a lightly-doped N-type substrate region 1. In this example, region 3 has, in top view, the shape of a rectangular bar. At the ends of the rectangular bar, in the upper portion of region 3, heavily-doped P-type contact regions 5a and 5b are provided. An oxide region 7 is arranged at the periphery of region 3 to delimit the resistor.

In this example, the resistor is covered with a stack of a nitride layer 9, of an oxide layer 11, and of a nitride layer 13. Above upper nitride layer 13, metal contact pads 15a and 15b, connected to contact regions 5a and 5b by vias 17a and 17b crossing layers 9, 11, and 13 are provided.

Figure 3A:
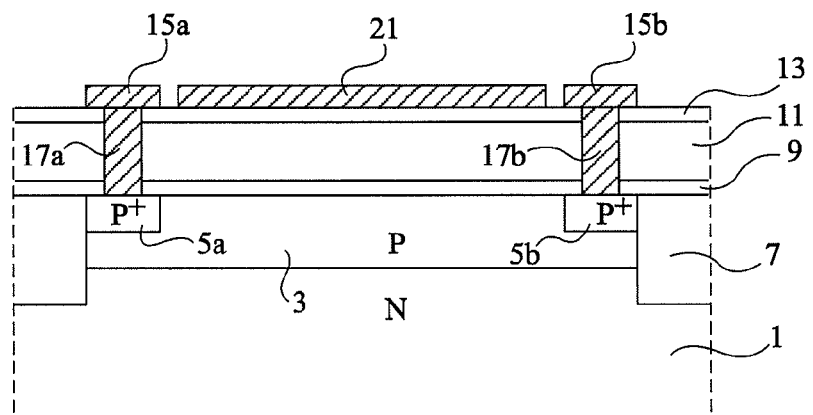
FIGS. 3A and 3B are cross-section and top views schematically showing another embodiment of a resistor which is particularly sensitive to temperature variations.

FIG. 3A is a cross-section view schematically showing another embodiment of an implanted resistor.

Figure 3B:
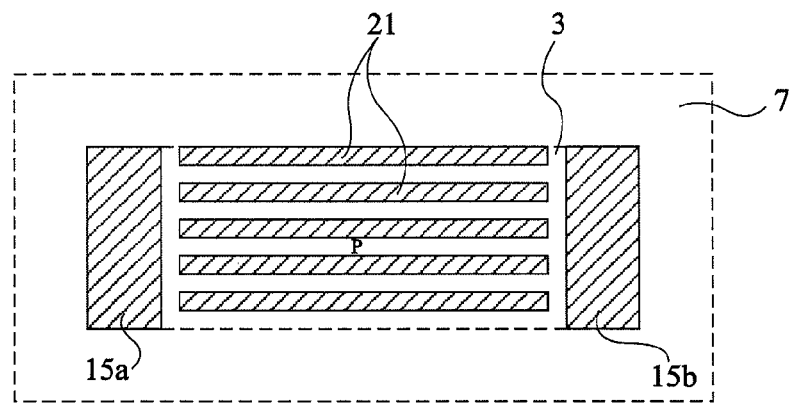

FIG. 3B is a top view of FIG. 3A.

The shown structure is identical to that described in relation with FIGS. 2A and 2B, but for the provision, above the resistor, of an array 21 of parallel unconnected metal lines, for example, copper or aluminum lines. In this example, the metal lines are longitudinal, that is, they extend in a direction parallel to the length of resistive region 3, between contact pads 15a and 15b.

The presence of array 21 of metal lines significantly enhances the sensitivity of the resistor to temperature variations. Indeed, the metal lines have a much greater thermal expansion coefficient than silicon. As an example, the thermal expansion coefficient of copper is on the order of $16.5 \times 10^{-6 \circ}$ $C.^{-1}$ and that of silicon is on the order of $3.5 \times 10^{-6 \circ} C.^{-1}$. The crystal deformation of the metal creates stress in the silicon structure. Thus, stress variations linked to the temperature variations are strongly amplified in resistive region 3. This results in a strong sensitivity of the resistor to temperature, if the stress direction corresponds to a properly-selected crystallographic axis of the crystal structure of silicon, as will be specified hereafter.

To maximize the sensitivity of the resistor to temperature variations, the metal lines are preferably arranged as close as possible to region 3. They, for example, correspond to the first metallization level of an integrated circuit chip. A dense array of thin lines is further preferably provided. Indeed, the provision of thin lines, as opposed to broad lines or to a continuous metal plate, enables obtaining a variation of the directional stress in the substrate, that is, mainly extending along the same direction, that of the metal lines. Further, this variation is substantially linear according to temperature.

As an example, oxide region 7 delimiting the resistor may have a thickness on the order of 350 nm, nitride region 9 may have a thickness on the order of 50 nm, insulating region 11 may have a thickness on the order of 500 nm, nitride region 13 may have a thickness on the order of 30 nm, and metal lines 21 may have a thickness on the order of 300 nm and a width on the order of 100 nm. In practice, the minimum line width authorized by the selected manufacturing technology may be selected.

Figure 4:
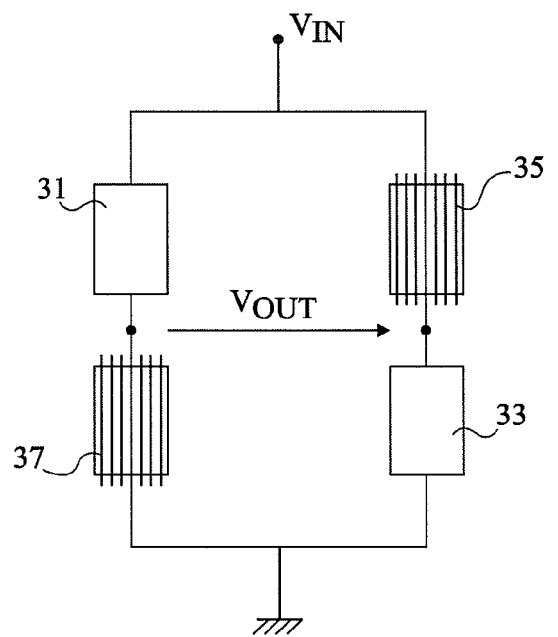
FIG. 4 is simplified top view of an embodiment of a device for measuring the temperature of the substrate of an integrated circuit chip.

FIG. 4 is a simplified top view of an embodiment of a device for measuring the substrate temperature of an integrated circuit chip. This device, formed in the chip substrate, comprises a Wheatstone bridge formed of four resistors 31, 33, 35, 37. Opposite resistors 31, 33 are implanted resistors formed as described in relation with FIGS. 2A and 2B. Opposite resistors 35, 37 are implanted resistors topped with an array of metal lines, such as described in relation with FIGS. 3A and 3B.

The effect of temperature variations of the substrate on resistors 35, 37 topped with metal lines and on resistors 31, 33 which are not topped with metal lines is different. Thus, a temperature variation causes a variation of the bridge unbalance value. As an example, a variation of output voltage $V_{OUT}$ on the order of from 5 to 10% can be observed when the substrate temperature increases from 25° C. to 100° C. The measurement of output voltage $V_{OUT}$ of the Wheatstone bridge thus enables determining the substrate temperature.

According to an alternative embodiment, instead of providing, on opposite resistors 35 and 37, an array of longitudinal metal lines such as described in relation with FIGS. 3A and 3B, an array of transverse metal lines, that is, of lines extending along the width of the resistive region, may be provided.

As a comparison, two identical resistors of square shape (in top view) are considered, the first resistor being covered with an array of vertical metal lines, and the second resistor being covered with an array of horizontal metal lines. It is further considered that, except for the line orientation, the two metal arrays are identical. For a given temperature variation, the variation of the first resistance is of the same amplitude as the variation of the second resistance, but in the opposite direction.

It should, however, be noted that in a single-crystal silicon substrate, the effect of stress variations in the substrate is likely to be different on resistors oriented along different crystallographic axes. It will be ascertained to orient the resistors and the metal lines so that stress variations in the silicon due to stress variations in the metal lines have a maximum influence upon the resistance value.

As an example, a single-crystal silicon substrate having its main surface in a crystal plane [001], that is, a plane orthogonal to crystal direction (110), and P-type resistors 31, 33, 35, 37 are here considered. Resistors 31, 33, 35, 37 are parallel to one another and are oriented, in Miller index notation, along direction (110). The metal lines arranged above resistors 35 and 37 may be longitudinal or transverse. In the case of N-type resistors, a same orientation forming a 45° angle with direction (110) will be selected for resistors 31, 33, 35, 37.

Figure 5:
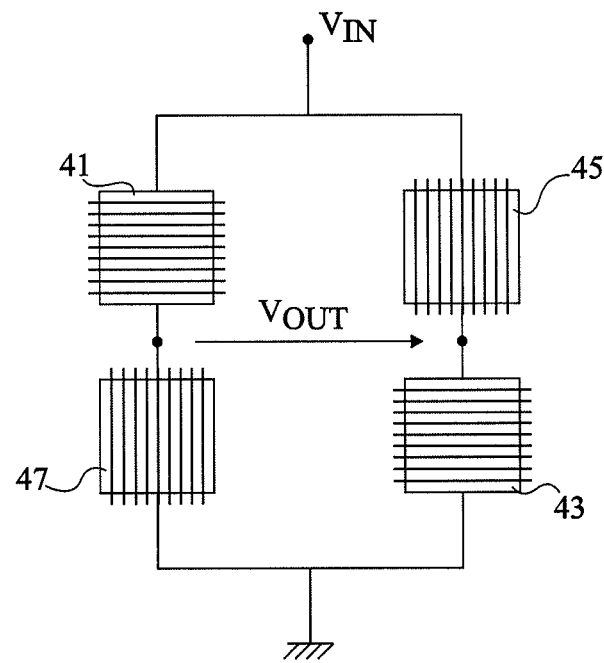
FIG. 5 is a simplified top view of an alternative embodiment of a device for measuring the temperature of the substrate of an integrated circuit chip.

FIG. 5 is a simplified top view of an alternative embodiment of a device for measuring the substrate temperature of an integrated circuit chip. Like the device of FIG. 4, this device comprises a Wheatstone bridge formed of four implanted resistors 41, 43, 45, 47. In this example, resistors 41, 43, 45, 47 are identical and have a square shape (in top view). Each resistor is covered with an array of metal lines, such as described in relation with FIGS. 3A and 3B. Opposite resistors 41 and 43 are covered with an array of transverse metal lines. Opposite resistors 45 and 47 are covered with an array of longitudinal lines.

The variations of resistors 41 and 43 linked to the temperature variations of the substrate are of the same amplitude as the variations of resistors 45 and 47, but of opposite sign.

Thus, a temperature variation causes a much larger variation of the bridge unbalance value than in the case described in relation with FIG. 4 for which only two resistors of the bridge are covered with an array of metal lines. As an example, a variation of output voltage $V_{OUT}$ approximately ranging from 15% to 25% can be observed when the substrate temperature increases from 25° C. to 100° C.

An advantage of the use of a Wheatstone bridge in a device for measuring the substrate temperature of a chip is that it enables performing an accurate measurement, substantially independent from the inaccuracies of the manufacturing process. Indeed, the four resistors of a Wheatstone bridge are formed simultaneously in the same very local region of a semiconductor wafer. It can thus be considered that, among the four resistors of the same bridge, manufacturing dispersions are negligible. Thus, although differences in the resistance values can be observed from one bridge to the other, unbalance values $V_{OUT}$ are, at equal temperatures, substantially identical.

Another advantage of the provided device is that its forming need no additional steps with respect to conventional manufacturing methods.

Specific embodiments of the present invention have been described. Various alterations, modifications, and improvements will occur to those skilled in the art.

In particular, the provision of copper or aluminum metal lines above some resistors has been mentioned hereabove. The present invention is not limited to these specific metals. It will be within the abilities of those skilled in the art to implement the desired operation by using any other adapted material having a thermal expansion coefficient different from that of the substrate.

Further, examples in Miller index notation of orientations of the resistors and of the metal lines topping the resistors, with respect to the crystal orientation of the substrate, have been given hereabove. Of course, the present invention is not limited to these specific examples. It will be within the abilities of those skilled in the art to select other proper orientations.

Similarly, in the examples described hereabove in relation with FIGS. 2A, 2B, 3A, 3C, the resistors comprise a P-type doped silicon region formed in a lightly-doped N-type region. It will be within the abilities of those skilled in the art to implement the desired operation by reversing the conductivity types. It will then be within their abilities to select proper orientations for the resistors and the metal lines. The desired operation may also be implemented for other resistor structures.

Moreover, it has been provided hereabove to form the arrays of metal lines of the device in the first metallization level of an integrated circuit chip. The metal lines may, of course, be formed in any other level, for example, in the first via level. However, the closer the metal lines are to the resistive region, the more sensitive the device is to temperature variations.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for detecting temperature variations of a substrate of an integrated circuit chip, comprising, in the substrate, implanted resistors connected as a Wheatstone bridge, wherein each of two first opposite resistors of the bridge is covered with an array of metal lines parallel to a first direction, the first direction being such that a variation in substrate stress along this direction causes a variation of an unbalance value of the bridge, wherein the implanted resistors each comprise a doped region of a first conductivity type formed in a substrate region of a second conductivity type.

2. The device of claim 1, wherein the first two opposite resistors have the shape, in top view, of parallel rectangular bars, the metal lines extending along the length of said bars.

3. The device of claim 1, wherein the metal lines are made of copper.

4. The device of claim 1, wherein the metal lines are made of aluminum.

5. The device of claim 1, wherein each of two second opposite resistors of the bridge is covered with an array of metal lines parallel to a second direction orthogonal to the first direction.

6. The device of claim 5, wherein the implanted resistors have, in top view, a square shape.

7. A device for detecting temperature variations, comprising:
    a substrate; and
    a bridge circuit formed in the substrate, the bridge circuit including a first implanted resistor coupled between a first voltage terminal and a first node, a second implanted resistor coupled between the first node and a second voltage terminal, a third implanted resistor coupled between the first voltage terminal and a second node, and a fourth implanted resistor coupled between the second node and the second voltage terminal, wherein parallel metal lines are formed on the second and third resistors and wherein a variation in voltage between the first and second nodes indicates a temperature variation of the substrate.

8. A device for detecting temperature variations as defined in claim 7, wherein the first, second, third and fourth implanted resistors each comprise a doped region of a first conductivity type formed in a substrate region of a second conductivity type.

9. A device for detecting temperature variations as defined in claim 7, wherein the parallel metal lines on the second and third implanted resistors are unconnected.

10. A device for detecting temperature variations as defined in claim 7, wherein the parallel metal lines are transverse to a long dimension of the second and third implanted resistors.

11. A device for detecting temperature variations as defined in claim 7, wherein the parallel metal lines are formed in a first metallization level of the device.

12. A device for detecting temperature variations as defined in claim 7, wherein the first, second, third and fourth implanted resistors are P-type resistors oriented along a crystal direction (110) of a silicon substrate.

13. A device for detecting temperature variations as defined in claim 7, wherein the first, second, third and fourth implanted resistors are N-type resistors forming a 45° angle with respect to a crystal direction (110) of a silicon substrate.

14. A device for detecting temperature variations as defined in claim 7, wherein the parallel metal lines are copper or aluminum.

15. A device for detecting temperature variations as defined in claim 7, wherein the parallel metal lines are separated from the second and third implanted resistors by a first nitride layer, an oxide layer and a second nitride layer.

16. A device for detecting temperature variations as defined in claim 7, wherein the parallel metal lines are parallel to a long dimension of the second and third implanted resistors.

17. A device for detecting temperature variations as defined in claim 16, further comprising parallel metal lines formed on the first and fourth implanted resistors, wherein the parallel metal lines on the first and fourth implanted resistors are transverse to a long dimension of the first and fourth implanted resistors.

18. A device for detecting temperature variations as defined in claim 17, wherein the first, second, third and fourth implanted resistors are square.

19. A method for making a device for detecting temperature variations of a substrate, comprising:
    forming in the substrate a bridge circuit including a first implanted resistor coupled between a first voltage terminal and a first node, a second implanted resistor coupled between the first node and a second voltage terminal, a third implanted resistor coupled between the first voltage terminal and a second node, and a fourth implanted resistor coupled between the second node and the second voltage terminal; and
    forming parallel metal lines on the second and third implanted resistors.

20. A method as defined in claim 19, wherein each of the first, second, third and fourth implanted resistors is formed as a doped region of a first conductivity type in a substrate region of a second conductivity type.

21. A method as defined in claim 19, wherein the parallel metal lines are formed transverse to a long dimension of the second and third implanted resistors.

22. A method as defined in claim 19, wherein the parallel metal lines are formed in a first metallization level of the device.

23. A method as defined in claim 19, wherein the first, second, third and fourth implanted resistors are P-type resistors oriented along a crystal direction (110) of a silicon substrate.

24. A method as defined in claim 19, wherein the first, second, third and fourth implanted resistors are N-type resistors forming a 45° angle with respect to a crystal direction (110) of a silicon substrate.

25. A method as defined in claim 19, further comprising forming a first nitride layer, an oxide layer and a second nitride layer between the parallel metal lines and the second and third implanted resistors.

26. A method as defined in claim 19, wherein the parallel metal lines are formed parallel to a long dimension of the second and third implanted resistors.

27. A method as defined in claim 26, further comprising forming parallel metal lines on the first and fourth implanted resistors, wherein the parallel metal lines on the first and fourth implanted resistors are transverse to a long dimension of the first and fourth implanted resistors.

* * * * *